US008789771B2

(12) United States Patent
Esche et al.

(10) Patent No.: US 8,789,771 B2
(45) Date of Patent: Jul. 29, 2014

(54) SWIVEL SPOUT ASSEMBLY

(71) Applicant: Kohler Co., Kohler, WI (US)

(72) Inventors: John C. Esche, Kohler, WI (US); William R. Bares, Fredonia, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 13/767,657

(22) Filed: Feb. 14, 2013

(65) Prior Publication Data

US 2013/0153070 A1 Jun. 20, 2013

Related U.S. Application Data

(63) Continuation of application No. 12/365,251, filed on Feb. 4, 2009, now Pat. No. 8,430,345.

(60) Provisional application No. 61/027,888, filed on Feb. 12, 2008.

(51) Int. Cl.

| | |
|---|---|
| ***B05B 15/08*** | (2006.01) |
| ***F16L 23/00*** | (2006.01) |
| ***F16B 13/00*** | (2006.01) |
| ***F16K 21/00*** | (2006.01) |
| ***E03C 1/04*** | (2006.01) |

(52) U.S. Cl.
USPC .................. 239/587.5; 239/587.1; 285/148.6; 137/801; 4/678

(58) Field of Classification Search
USPC ..................... 239/587.1, 587.2, 587.5, 587.6; 285/148.6; 137/615, 801; 4/676, 677, 4/678
See application file for complete search history.

(56) References Cited

U.S. PATENT DOCUMENTS

| | | | | |
|---|---|---|---|---|
| 2,654,390 | A * | 10/1953 | Archer et al. | 137/606 |
| 4,739,523 | A * | 4/1988 | Bondar | 4/678 |
| 6,321,788 | B1 | 11/2001 | Egli | |
| 6,983,957 | B2 | 1/2006 | Bettinger | |
| 7,415,991 | B2 * | 8/2008 | Meehan et al. | 137/801 |
| 8,430,345 | B2 * | 4/2013 | Esche et al. | 239/587.5 |

FOREIGN PATENT DOCUMENTS

| | | |
|---|---|---|
| DE | 31 33 267 | 3/1983 |
| DE | 2020070 13 444 | 1/2008 |

OTHER PUBLICATIONS

Seven pages of a PCT search report of PCT/US2009/000867 dated Aug. 7, 2009 in a corresponding PCT application.

* cited by examiner

*Primary Examiner* — Ryan Reis
(74) *Attorney, Agent, or Firm* — Foley & Lardner LLP

(57) ABSTRACT

A faucet is disclosed having a faucet base, a faucet spout mounted on the base and configured to swivel relative thereto, a female connector sleeve having an axial through channel, and a male connector sleeve having an axial through channel that is in fluid communication with the axial through channel of the female connector sleeve, the male connector sleeve being telescopically received within the female connector sleeve. The faucet further includes a first tube connected between one of the male and female connector sleeves and a fluid control valve, and a second tube separately formed from the spout, the female connector, and the male connector and connected between the other of the male and female connector sleeves and an outlet of the spout by internally extending within the spout. The male connector sleeve rotates within and relative to the female connector sleeve when the spout and second tube swivel relative to the base.

21 Claims, 4 Drawing Sheets

SWIVEL SPOUT ASSEMBLY

CROSS-REFERENCE TO RELATED PATENT APPLICATIONS

This application is a Continuation of U.S. patent application Ser. No. 12/365,251, filed Feb. 4, 2009, which claims priority from U.S. Provisional Application 61/027,888, filed Feb. 12, 2008, both of which are incorporated herein by reference in their entireties.

STATEMENT OF FEDERALLY SPONSORED RESEARCH OR DEVELOPMENT

Not applicable.

BACKGROUND

The present disclosure relates to faucets having swiveling spouts. More particularly it relates to structures for accommodating an internal tubing carrying water from a mixing valve to the spout outlet in such a swiveling spout.

Many sinks have faucets positioned at the rearward end thereof, or immediately behind the sink. Such sinks may have relatively wide single basins, or may have multiple basins. Thus, it is often desirable for a faucet spout used therewith to be able to swivel so as to be able to direct water between multiple basins, or to a specific part of a wide basin.

Even where a basin is not very large, it may be desirable to direct water to a pot or other reservoir positioned in the basin. Again, swiveling of the spout is a traditional solution for this need.

However, in recent years there has been an increased desire to minimize the contact between potable water and the metallic spout housing. This can be because one wants to reduce the corrosive effects of water on the housing. Alternatively, this can be because the metal housing is a leaded brass which regulators wish to keep separate from potable water.

One means of reducing the exposure of the potable water to lead-containing components has been to direct the water from a mixing valve through a polymeric tubing housing with the faucet spout. The tubing exits at the spout outlet to minimize the spout metal contacting the potable water.

However, the inclusion of such a tube in a fixed spout is relatively straightforward. On the other hand, including such a tube in a spout that swivels as desired for use in a kitchen environment is more problematic.

In this regard, if one end of the tube is fixed to a mixing valve, and the other swivels with the spout, the middle of the tube will be subjected to strain. This can create resistance to the swiveling, a tendency of the spout to remain in a swiveled position, and a potential wear point that may break.

Accordingly, there is a need for an improved swiveling spout that incorporates an internal tubing without also causing the above problems.

SUMMARY

This disclosure provides a faucet which has a faucet base connected to a fluid control valve, a faucet spout mounted on the base to be able to swivel relative thereto, and a conduit assembly positioned within the faucet and extended between the fluid control valve and an outlet of the faucet spout. The conduit assembly has a female connector sleeve having an axial through channel, and a male connector sleeve having an axial through channel in fluid communication with the axial through channel of the female connector sleeve. Thus, the male connector sleeve is telescopically received within the female connector sleeve.

There is also a first tube connected between a connector sleeve and the fluid control valve, and a second tube connected between another connector sleeve and the outlet of the spout. The male connector sleeve can rotate within and relative to the female connector sleeve when the spout swivels relative to the base.

In preferred forms there is a seal is located between the male connector sleeve and the female connector sleeve. For example, the seal can be an o-ring seal mounted in a recess on a radial periphery of the male connector sleeve.

Preferably the first tube is crimped or otherwise attached onto an end of the female connector sleeve and the second tube is crimped or otherwise attached onto an end of the male connector sleeve. A clip retains the male connector sleeve telescoped into the female connector sleeve. In a particularly preferred form the clip has a resilient barb that snaps onto a projection of the male connector sleeve to retain the male connector sleeve against disassembly from the female connector sleeve.

Hence, when the spout swivels it carries with it one of the tubes and one of the connectors. However, the other tube and connector do not rotate. Thus, there is no stress along the tube, and the tube provides no resistance to rotation.

Importantly, the combination of the telescoping connection and seal between the connector sleeves avoids leakage, while still permitting relative rotation. Also, means are provided to keep the telescoping parts from axially separating from each other, without introducing undesired resistance to spout swiveling.

As a polymeric tube structure can carry potable water from the mixing valve to the spout outlet, contact between the potable water and the spout housing is reduced or avoided. This avoids corrosion of the metallic housing, and may avoid any perceived risk of lead or other content of the metal housing leaching into the potable water.

One embodiment of the present disclosure relates to a faucet including a faucet base, a faucet spout mounted on the base and configured to swivel relative thereto, a female connector sleeve having an axial through channel, and a male connector sleeve having an axial through channel that is in fluid communication with the axial through channel of the female connector sleeve, the male connector sleeve being telescopically received within the female connector sleeve. The faucet further includes a first tube connected between one of the male and female connector sleeves and a fluid control valve, and a second tube separately formed from the spout, the female connector, and the male connector and connected between the other of the male and female connector sleeves and an outlet of the spout by internally extending within the spout. The male connector sleeve rotates within and relative to the female connector sleeve when the spout and second tube swivel relative to the base.

Another embodiment relates to a faucet including a faucet base, a faucet spout mounted on the base and configured to swivel relative thereto, and a conduit assembly positioned within the faucet and configured to carry a fluid from a fluid control valve to an outlet of the faucet spout. The conduit assembly includes a female connector sleeve having an axial through channel, a male connector sleeve having an axial through channel that is in fluid communication with the axial through channel of the female connector sleeve, a first tube having a first end connected to one of the female and male connector sleeves and having a second end configured to receive a flow of fluid from the fluid control valve, and a second tube having a first end connected to the outlet and a second end connected to the other of the female and male connector sleeves. The male connector sleeve rotates within and relative to the female connector sleeve when the spout and second tube swivel relative to the base.

Another embodiment relates to a faucet including a faucet base, a faucet spout mounted on the base and configured to swivel relative thereto, a first connector sleeve having an axial through channel, a second connector sleeve having an axial through channel that is in fluid communication with the axial through channel of the first connector sleeve, and a first tube having a first end connected to the first connector sleeve and a second end configured to receive a flow from a fluid control valve. The spout includes an inlet end, an outlet end opposite the inlet end, and an outlet located proximate the outlet end. The faucet further includes a second tube extending within the spout and having a first end connected to the outlet and a second end connected to the second connector sleeve proximate the inlet end of the spout. One of the first and second connector sleeves is male, and the other of the first and second connector sleeves is female. The second connector sleeve rotates relative to the first connector sleeve when the spout and second tube swivel relative to the base.

These and still other advantages of the invention will be apparent from the detailed description and drawings. What follows is merely a description of one preferred embodiment of the present invention. To assess the full scope of the invention the claims should be looked to as this preferred embodiment is not intended to be the only embodiment within the scope of the claims.

DETAILED DESCRIPTION

Figure 1:
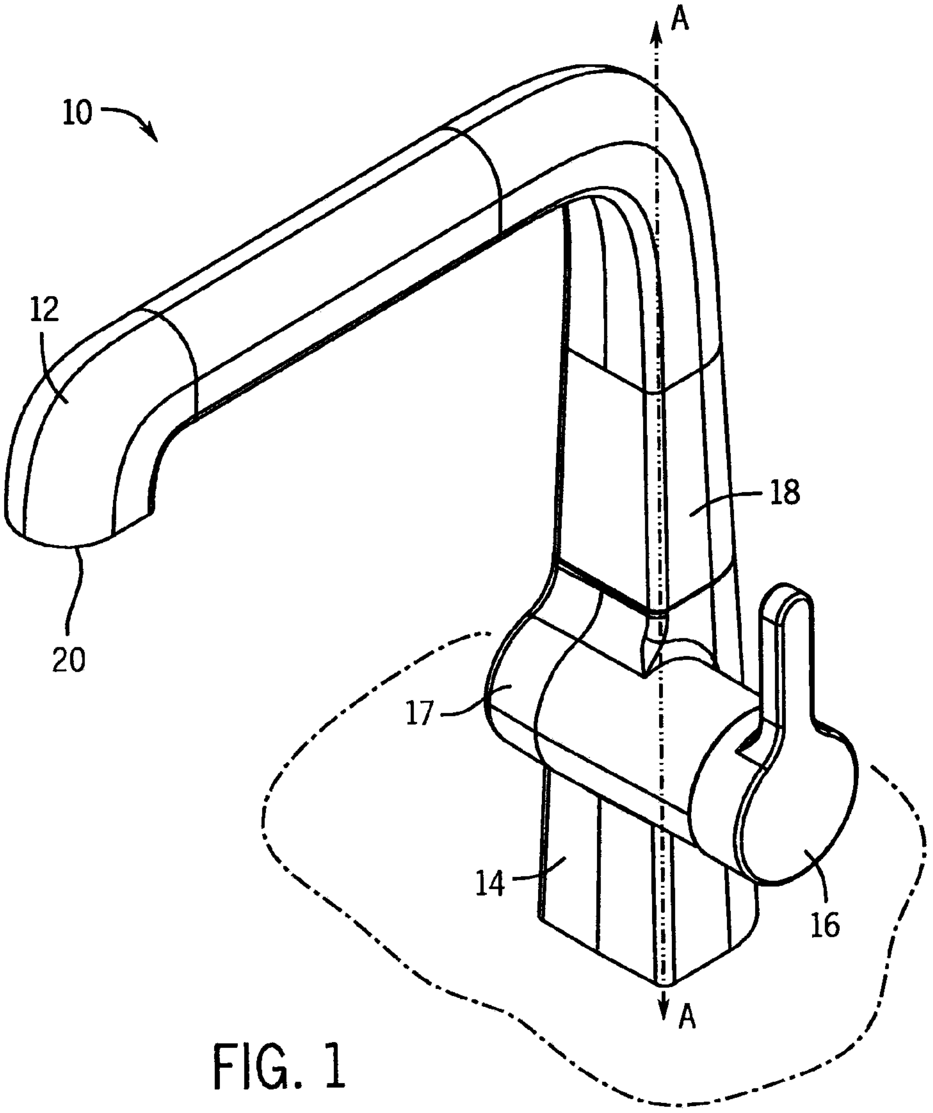
FIG. 1 is a perspective view of a faucet of the present invention.

FIG. 1 illustrates a faucet 10 suitable for use adjacent a basin (e.g. a kitchen sink or other plumbing basin). The faucet 10 has a spout 12 extending up and out from a base 14. Extending out from a side of the base 14 is a control handle 16 that can be rotated or otherwise moved to control the flow and temperature of water from a mixing valve 17 through the spout 12.

The spout 12 can be swiveled about an essentially vertical axis A relative to the base 14, about a connector assembly 18. This swiveling alters the location of the spout outlet 20 relative to the base 14, to direct the flow of water from the spout 12 to various locations or basins.

Figure 2:
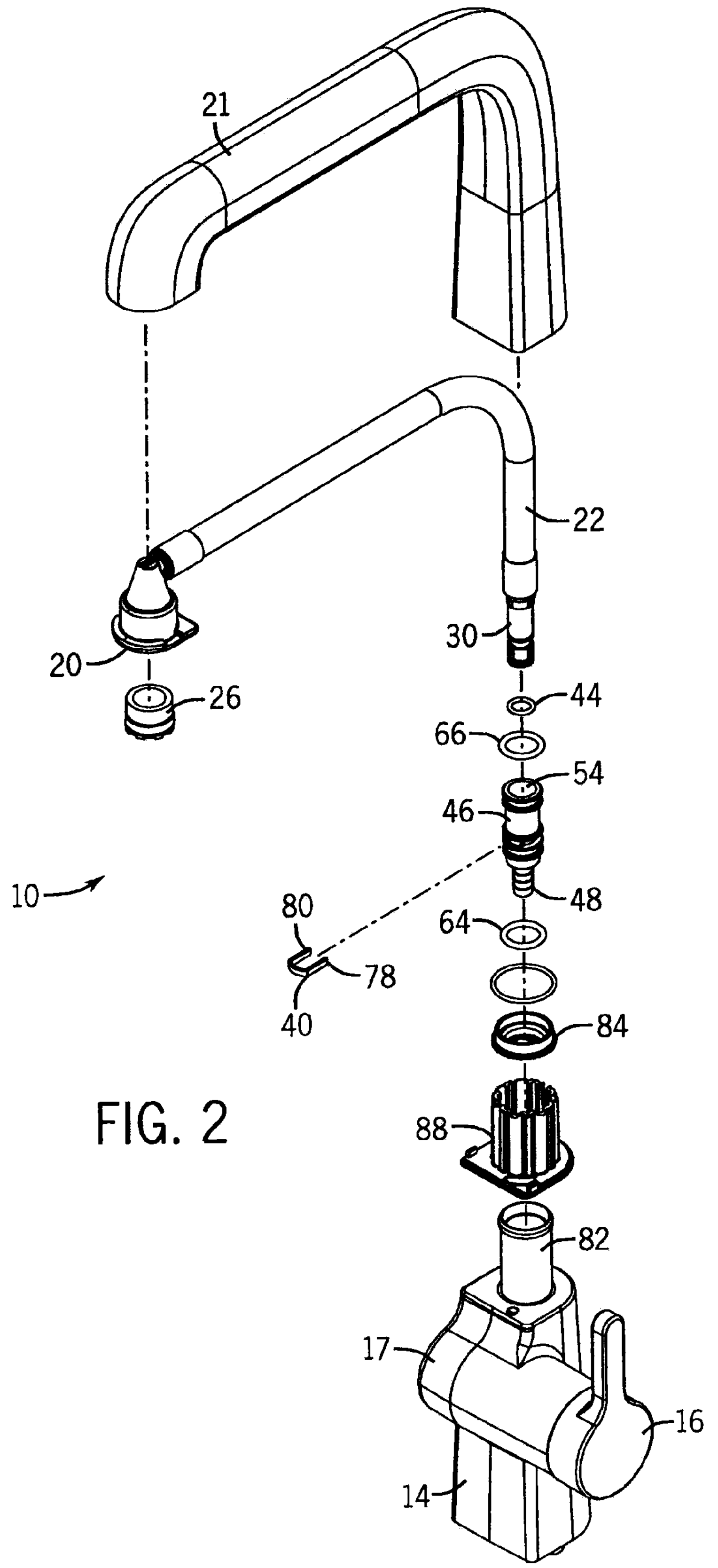
FIG. 2 is an exploded perspective view thereof.
Figure 3:
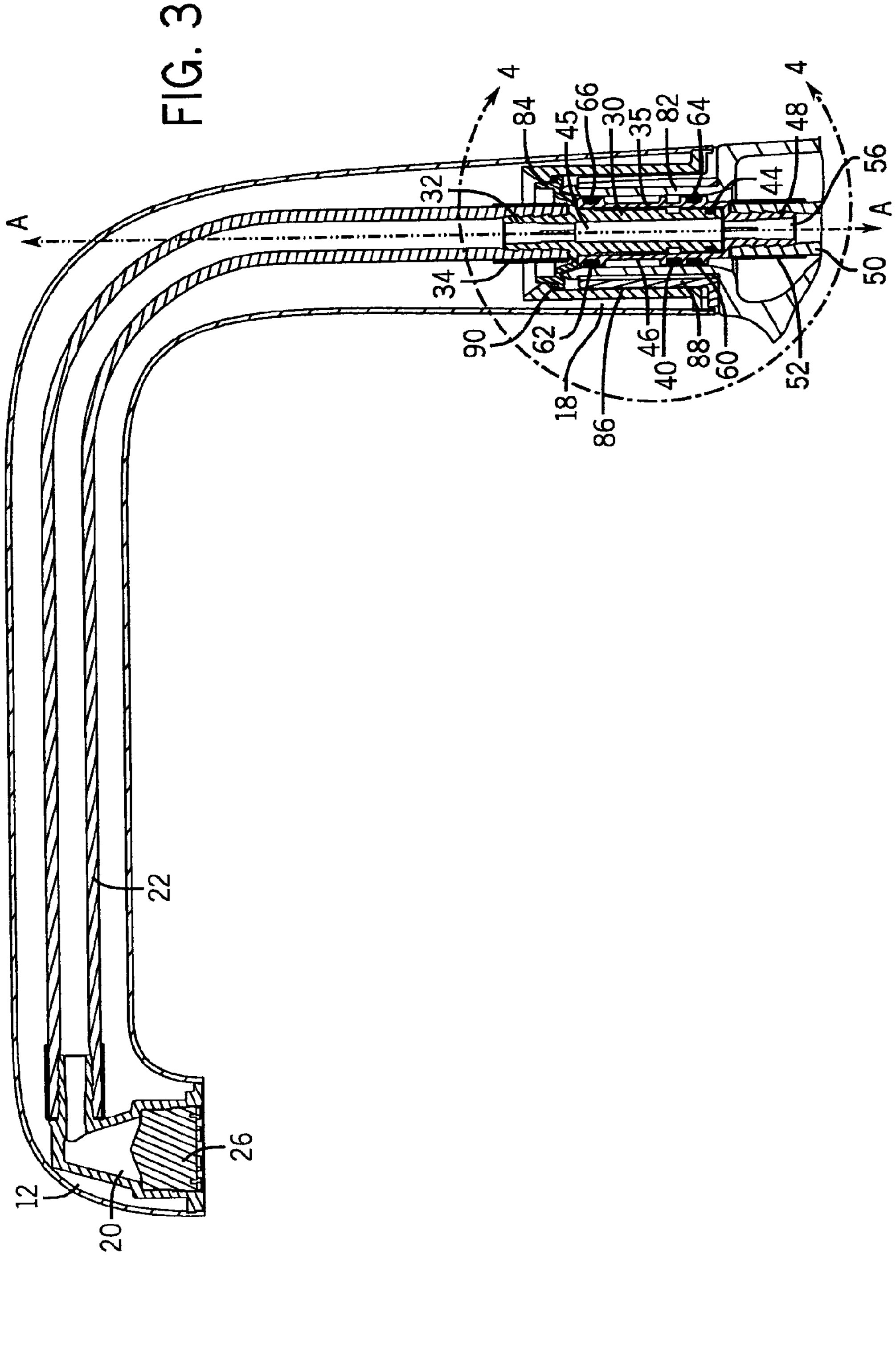
FIG. 3 is a cross-sectional view taken along line 3-3 of FIG. 1.
Figure 4:
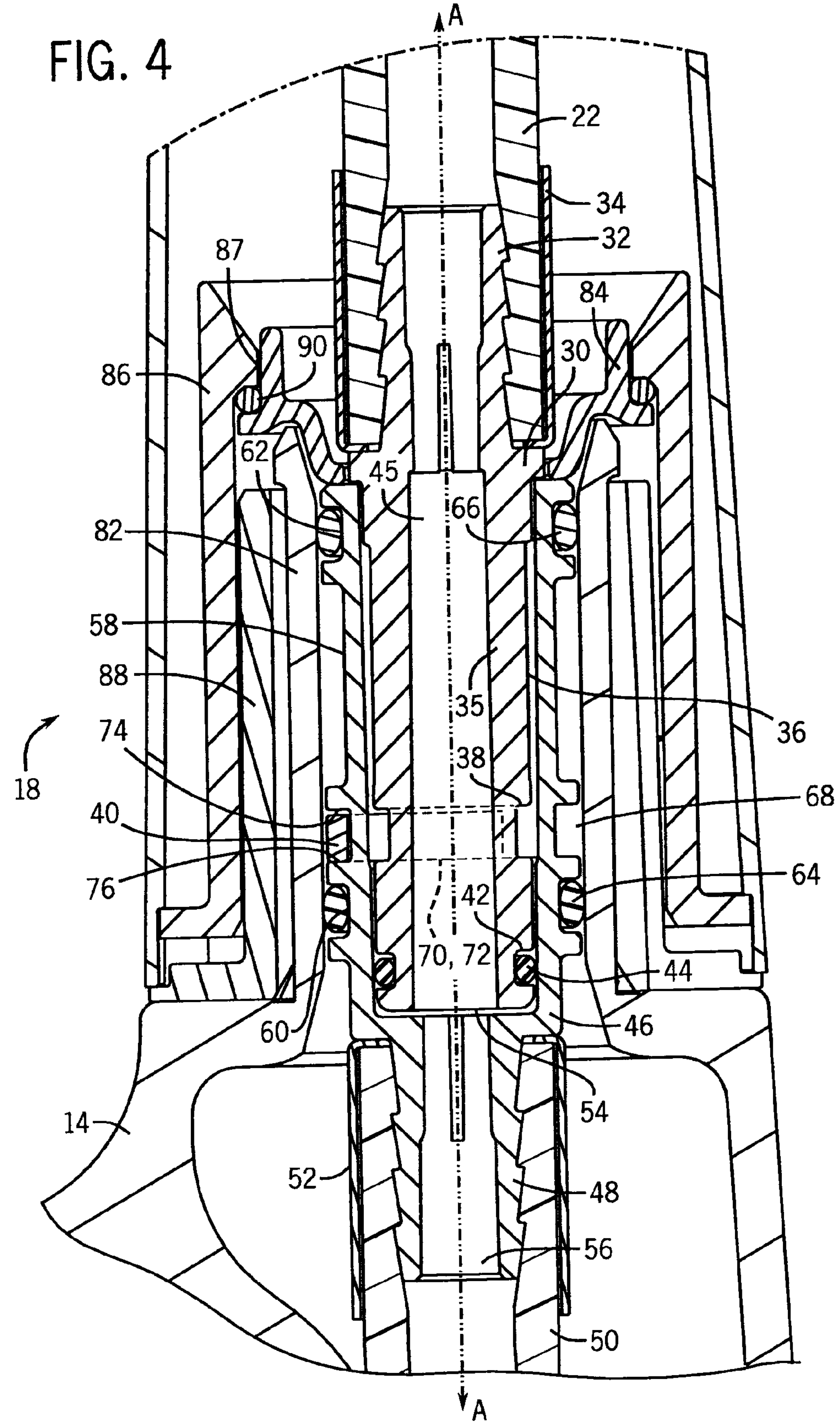
FIG. 4 is a detailed cross-sectional view of the portion of the faucet highlighted in FIG. 3.

Now referring more to FIGS. 2, 3 and 4, there is shown a spout housing 21 containing a polymeric tube 22 having on one end an outlet linked to aerator 26. The other end of the polymeric tube 22 is mounted to a male connector sleeve 30 that has a barbed portion 32 inserted into the tube 22.

The barbed portion 32 is further secured to the tube 22 by crimping a crimping structure 34 over the outer surface of the tube 22 in the region in which the barbed portion 32 of the male connector sleeve 30 is inserted. This crimping structure 34 can be made of a deformable material such as, for example, brass and rigidly links the male connector sleeve 30 to the tube 22.

The male connector sleeve 30 has a hollow cylindrical extension 35 that extends down from the tube 22. The cylindrical extension 35 has an outer surface 36 that has an annular recess 38 for receiving a retaining clip 40 and an annular recess 42 for receiving an o-ring 44. The cylindrical extension 35 also has an axially extending channel 45.

A female connector sleeve 46 has a barbed portion 48 that is inserted into another polymeric tube 50. Similarly, tube 50 can be crimped to the barbed portion 48 using a crimping structure 52.

The female connector sleeve 46 has an inner through channel 54, in part for receiving the cylindrical extension 35 of the male connector sleeve 30. This inner through channel 54 extends axially through the female connector sleeve 46, including via portion 56 that extends through the barbed portion 48.

On the outer surface 58 of the female connector sleeve 46 are various features. Two annular recesses 60 and 62 are provided for receiving additional o-rings 64 and 66 that extend around the outer surface 58 and create friction between the female connector and the base 14. Additionally, the outer surface 58 has an annular recess 68 including two parallel slots 70 and 72. The two parallel slots 70 and 72 extend from the outer surface 58 into the inner through channel 54.

The annular recess 68 is defined between an upper stop surface 74 and a lower stop surface 76. This structure permits the legs 78 and 80 of the retaining clip 40 to be inserted into the two parallel slots 70 and 72 such that the retaining clip 40 engages the annular flange 38 of the male connector sleeve 30.

When the retaining clip 40 engages the male connector sleeve 30 and the female connector sleeve 46, the axially extending through channels 45 and 56 are held in fluid communication with one another. In this way, the tubes 22 and 50 are also placed in fluid communication with one another. The seals prevent leakage.

It should be appreciated that the connector sleeve assembly permits the rotation of the spout, and thus upper tube, without stressing the lower tube. At the same time, the retaining clip 40 prevents the sleeves 30 and 46 from disconnecting.

In the preferred embodiment the female connector sleeve 46 is inserted into a cylindrical hollow portion 82 of the base 14, and is, in part, compressively held in the cylindrical hollow portion 82 by the o-rings 64 and 66. In addition to the o-rings 64 and 66, a round flange 84 is placed on the top of the cylindrical hollow portion 82 to hold the top of the female connector sleeve 46 in the base 14.

The bearing components 86 and 88 permit the rotation of the spout 12 relative to the base 14. The bearing component 86 has an inwardly extending circular ledge 87 holds an o-ring 90 against the round flange 84, thus preventing the connector sleeve sub-assembly from sliding into the spout housing 21.

Thus, the present invention provides a faucet with the swiveling capability and the desired advantages, but without the undesired disadvantages. It should be appreciated that a preferred embodiment of the invention has been described above. However, many modifications and variations to this preferred embodiment will be apparent to those skilled in the art, which will be within the spirit and scope of the invention. For example, the female connector could be linked to the spout tube, with the male connector linked to the mixing valve tube.

Therefore, the invention should not be limited to just the specifically described embodiments. To ascertain the full scope of the invention, the following claims should be referenced.

INDUSTRIAL APPLICABILITY

The invention provides faucets having internal carrier tubes, where the faucet spout can swivel relative to the faucet base without stressing the tubes.

What is claimed:

1. A faucet comprising:

a faucet base;

a faucet spout mounted on the faucet base and configured to swivel relative thereto;

a female connector sleeve having an axial through channel and an inner shoulder, wherein a first portion of the through channel extends in a first direction from the shoulder and a second portion of the through channel extends in a second direction from the shoulder;

a male connector sleeve having an axial through channel that is in fluid communication with the axial through channel of the female connector sleeve, the male connector sleeve being telescopically received within the first portion of the through channel of the female connector sleeve;

a seal sealingly engaging between the male connector sleeve and the female connector sleeve;

a first tube connected between one of the male and female connector sleeves and a fluid control valve; and a second tube separately formed from the faucet spout, the female connector sleeve, and the male connector sleeve and connected between the other of the male and female connector sleeves and an outlet of the faucet spout by internally extending within the faucet spout;

wherein the male connector sleeve is directly connected to one of the first tube and the second tube, and wherein the male connector sleeve rotates within and relative to the female connector sleeve when the faucet spout and the second tube swivel relative to the faucet base.

2. The faucet of claim 1, wherein the seal is an o-ring seal mounted in a recess on a radial periphery of the male connector sleeve.

3. The faucet of claim 1, wherein the first tube is crimped onto an end of the female connector sleeve and the second tube is crimped onto an end of the male connector sleeve.

4. The faucet of claim 1, further comprising a clip having a resilient barb that snaps onto a projection of the male connector sleeve to retain the male connector sleeve against disassembly from the female connector sleeve.

5. A faucet comprising:

a faucet base;

a faucet spout mounted on the faucet base and configured to swivel relative thereto;

a conduit assembly positioned within the faucet and configured to carry a fluid from a fluid control valve to an outlet of the faucet spout, the conduit assembly comprising:

a female connector sleeve having an axial through channel;

a male connector sleeve having an axial through channel that is in fluid communication with the axial through channel of the female connector sleeve, a first tube having a first end connected to one of the female and male connector sleeves and having a second end configured to receive a flow of fluid from the fluid control valve; and a second tube having a first end connected to the outlet and a second end connected to the other of the female and male connector sleeves;

wherein the female connector sleeve is directly connected to one of the first tube and the second tube; and wherein the male connector sleeve rotates within and relative to the female connector sleeve when the faucet spout and the second tube swivel relative to the base, and wherein the female connector sleeve rotates within and relative to the faucet base.

6. The faucet of claim 5, wherein the first tube is coupled to the female connector sleeve.

7. The faucet of claim 5, wherein the conduit assembly also includes a structure for coupling the first tube to the one of the female and male connector sleeves, and wherein the first tube is secured to the one of the female and male connector sleeves by crimping the structure.

8. The faucet of claim 5, wherein the first tube is coupled to the male connector sleeve.

9. The faucet of claim 5, wherein the conduit assembly also includes a structure for coupling the second tube to the other of the female and male connector sleeves, and wherein the second tube is secured to the other of the male and female connector sleeves by crimping the structure.

10. A faucet comprising:

a faucet base;

a faucet spout mounted on the faucet base and configured to swivel relative thereto, the faucet spout comprising:

an inlet end;

an outlet end opposite the inlet end; and an outlet located proximate the outlet end;

a first connector sleeve having an axial through channel;

a second connector sleeve having an axial through channel that is in fluid communication with the axial through channel of the first connector sleeve, a first tube having a first end connected to the first connector sleeve and a second end configured to receive a flow from a fluid control valve; and a second tube extending within the faucet spout and having a first end connected to the outlet and a second end connected to the second connector sleeve proximate the inlet end of the faucet spout;

wherein the first tube, the first connector sleeve, the second connector sleeve, and the second tube are configured such that fluid flows from the first tube into the first connector sleeve, from the first connector sleeve into the second connector sleeve, and from the second connector sleeve into the second tube;

wherein one of the first and second connector sleeves is a male connector sleeve, and the other of the first and second connector sleeves is a female connector sleeve, and wherein a clip extends through the female connector sleeve to engage the male connector sleeve and to retain the male connector sleeve against disassembly from the female connector sleeve; and wherein the second connector sleeve rotates relative to the first connector sleeve when the faucet spout and the second tube swivel relative to the faucet base.

11. The faucet of claim 10, further comprising a structure for coupling the first tube to the first connector sleeve.

12. The faucet of claim 11, wherein the first tube is secured to the first connector sleeve by crimping the structure.

13. The faucet of claim 10, further comprising a structure for coupling the second tube to the second connector sleeve.

14. The faucet of claim 13, wherein the second tube is secured to the second connector sleeve by crimping the structure.

15. The faucet of claim 10, wherein the clip includes a resilient barb that snaps onto a projection of the male connector sleeve to retain the male connector sleeve against disassembly from the female connector sleeve.

16. The faucet of claim 10, wherein the first connector sleeve is rotatably coupled to the second connector sleeve.

17. The faucet of claim 10, wherein at least one of the first connector sleeve and the second connector sleeve comprises a barbed portion for coupling the at least one of the first connector sleeve and the second connector sleeve to the first tube or the second tube, respectively.

18. The faucet of claim 5, wherein the male connector sleeve is telescopically received in the female connector sleeve.

19. The faucet of claim 5, wherein the one of the female and male connector sleeves comprises a first barbed portion for insertion into the first tube, and the other of the female and male connector sleeves comprises a second barbed portion for insertion into the second tube.

20. The faucet of claim 5, wherein the male connector sleeve is directly connected to the other of the first tube and the second tube.

21. The faucet of claim 1, wherein an end of the male connector sleeve is adjacent the shoulder of the female connector sleeve.

* * * * *